G. Crouch,

Shawl Strap.

No. 4289. Reissued Mar. 7. 1871.

Witnesses,

Chas. H. Smith

Harold Perrell

George Crouch,

Lemuel M. Serrell atty.

N. PETERS, PHOTO-LITHOGRAPHER, WASHINGTON, D. C.

UNITED STATES PATENT OFFICE.

GEORGE CROUCH, OF WESTPORT, CONNECTICUT.

IMPROVEMENT IN SHAWL-STRAPS.

Specification forming part of Letters Patent No. 82,606, dated September 29, 1868; reissue No. 4,289, dated March 7, 1871.

*To all whom it may concern:*

Be it known that I, GEORGE CROUCH, of Westport, in the county of Fairfield and State of Connecticut, have invented and made an Improvement in Straps for Shawls, &c.; and the following is declared to be a correct description thereof.

Before my invention, straps had been used to confine a shawl or similar article in a bundle, and a leather cross-piece, with loops at the ends, had extended from one strap to the other, and above, and attached to, this leather cross-piece was a handle. This leather cross-piece or connecting-strap is liable to bend and allow the straps to be drawn toward each other by the handle in sustaining the weight; hence the bundle is not kept in a proper shape, and this handle is inconvenient to grasp.

My invention consists in a rigid cross-bar beneath the handle, combined with suspending-straps that are to be passed around the shawl or bundle, such straps passing through loops at the ends of the handle.

Figure 2:
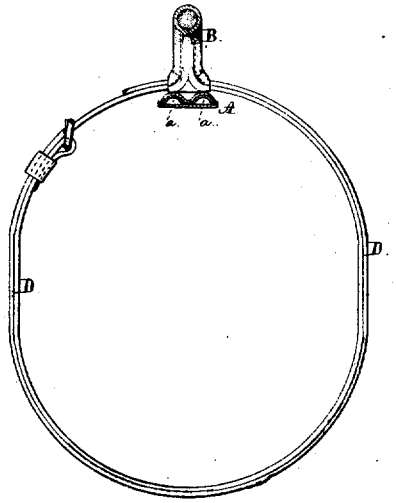
Figure 1:
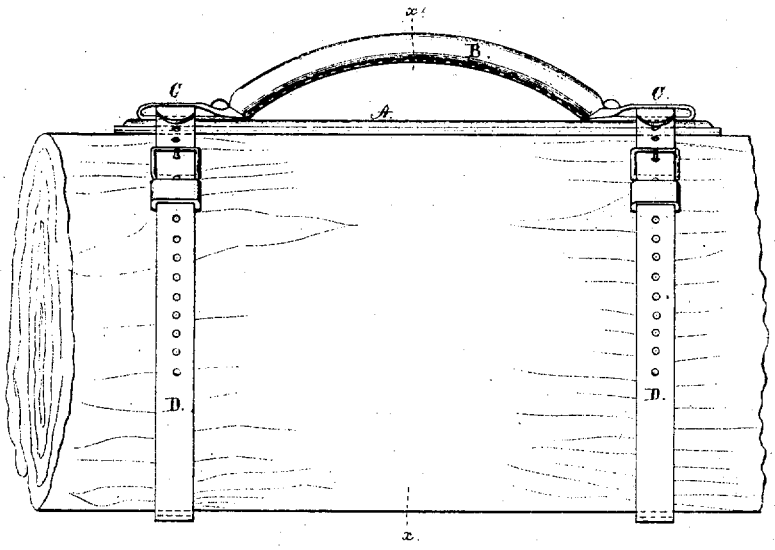

In the drawing, Figure 1 is an elevation of the shawl-strap as in use, and Fig. 2 is a section at the line *x x*.

The cross-bar A is made of rigid material, and connected to the same is the handle B. C C are loops for the suspending-straps D D to pass through. This rigid cross-bar A prevents the handle B drawing the loops C C and straps D toward each other, and keeps the ends of the handle at the proper distance apart, and, consequently, the shawl or bundle is suspended and preserved in the proper shape in transportation.

The loops C are shown as made from the leather of the handle B, extending beyond the end of such handle, and folded to form the loops. This is much preferable to the loops made at the ends of the leather strap heretofore used below the handle.

The straps D D are to be of any usual character; and I prefer to make the rigid cross-bar of thin sheet metal, stamped up in the corrugated form shown sectionally in Fig. 2 at *a a*, and covered with leather, as this form insures strength and stiffness with but little weight.

I claim as my invention—

1. The rigid cross-bar A, connecting the ends of the handle B, and provided with loops C for the straps D, substantially as and for the purposes set forth.

2. The loops C C, made of the leather of the handle, and secured to the rigid cross-bar A, as and for the purposes set forth.

3. The rigid cross-bar for a shawl-strap, made of sheet metal, corrugated, and covered with leather, as and for the purposes set forth.

Signed by me this 3d day of February, A. D. 1871.

GEO. CROUCH.

Witnesses:

CHAS. H. SMITH,

GEO. T. PINCKNEY.